US010735233B2

(12) United States Patent
Tsodik et al.

(10) Patent No.: US 10,735,233 B2
(45) Date of Patent: Aug. 4, 2020

(54) METHOD AND APPARATUS FOR DETERMINING CP VALUE

(71) Applicant: HUAWEI TECHNOLOGIES CO., LTD., Shenzhen, Guangdong (CN)

(72) Inventors: Genadiy Tsodik, Hod Hasharon (IL); Ningjuan Wang, Shenzhen (CN); Jian Yu, Shenzhen (CN); Xin Xue, Shenzhen (CN); Shimon Shilo, Hod Hasharon (IL); Doron Ezri, Hod Hasharon (IL); Oded Redlich, Hod Hasharon (IL); Le Liu, Shenzhen (CN); Wei Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/017,083

(22) Filed: Jun. 25, 2018

(65) Prior Publication Data
US 2018/0309607 A1 Oct. 25, 2018

Related U.S. Application Data

(63) Continuation of application No. PCT/CN2015/098893, filed on Dec. 25, 2015.

(51) Int. Cl.
*H04B 17/00* (2015.01)
*H04L 27/26* (2006.01)
*H04L 25/02* (2006.01)

(52) U.S. Cl.
CPC ...... *H04L 27/2607* (2013.01); *H04L 25/0204* (2013.01); *H04L 27/2646* (2013.01)

(58) Field of Classification Search
CPC ............. H04L 27/2607; H04L 25/0204; H04L 27/2646
USPC ................. 375/224, 219, 316, 295
See application file for complete search history.

(56) References Cited

U.S. PATENT DOCUMENTS

| 8,792,369 | B2 | 7/2014 | Alanaerae et al. |
| 9,059,886 | B1 | 6/2015 | Lee et al. |
| 2013/0022090 | A1 | 1/2013 | Weng et al. |
| 2015/0117363 | A1* | 4/2015 | Rong ................. H04L 27/2607 370/329 |

(Continued)

FOREIGN PATENT DOCUMENTS

| CN | 102158884 A | 8/2011 |
| CN | 105099635 A | 11/2015 |

(Continued)

OTHER PUBLICATIONS

International Search Report and Written Opinion issued in International Application No. PCT/CN2015/098893 dated Sep. 26, 2016, 11 pages.

(Continued)

*Primary Examiner* — Zewdu A Kassa
(74) *Attorney, Agent, or Firm* — Fish & Richardson P.C.

(57) ABSTRACT

The present application provides a method for determining a CP. A STA performs channel estimation, determines a CP value according to the result of channel estimation, and sends indication information to an AP, wherein the indication information is used for indicating the CP value, so that the AP may choose a suitable CP according to the indication information. Therefore, overhead may be reduced and system throughput may be optimized.

4 Claims, 4 Drawing Sheets

(56) References Cited

U.S. PATENT DOCUMENTS

2017/0127411 A1\* 5/2017 Miao .................. H04L 27/2607

FOREIGN PATENT DOCUMENTS

| WO | 2012094505 A1 | 7/2012 |
| WO | 2013166725 A1 | 11/2013 |

OTHER PUBLICATIONS

Extended European Search Report issued in European Application No. 15911178.0 dated Nov. 19, 2018, 7 pages.
Office Action issued in Chinese Application No. 201580085547.9 dated Nov. 12, 2019, 14 pages (with English translation).

\* cited by examiner

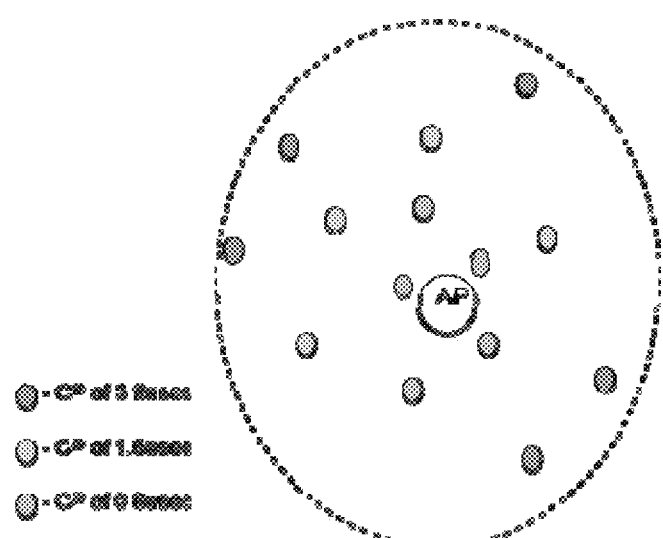
Figure 3
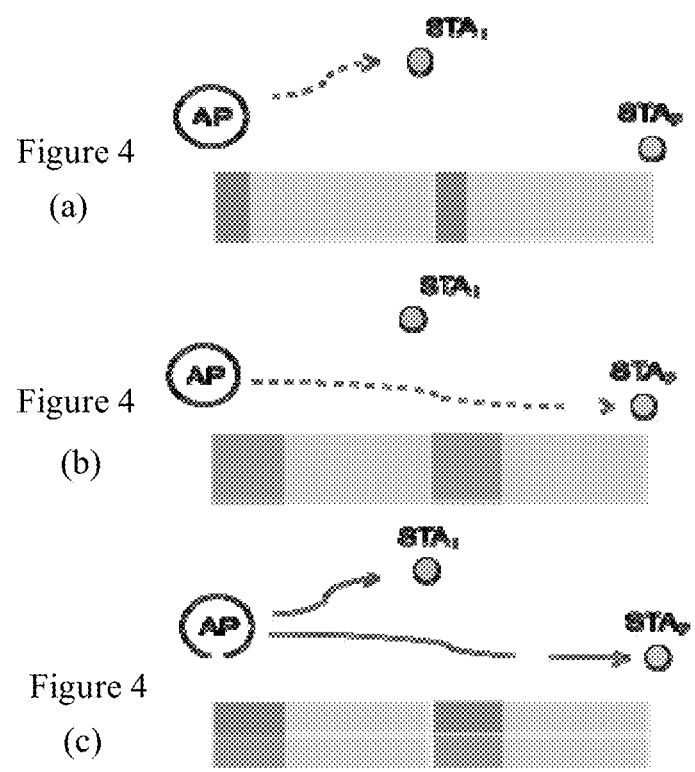
Figure 4 (a)
Figure 4 (b)
Figure 4 (c)

METHOD AND APPARATUS FOR DETERMINING CP VALUE

CROSS-REFERENCE TO RELATED APPLICATIONS

This application is a continuation of International Application No. PCT/CN2015/098893, filed on Dec. 25, 2015, the disclosure of which is hereby incorporated by reference in its entirety.

TECHNICAL FIELD

The embodiments of the present invention relate to a field of communication technology, and particularly, to a method and an apparatus for determining a CP value.

BACKGROUND

The main purpose of Cyclic Prefix (CP) is to make Orthogonal Frequency Division Multiplexing (OFDM) transmission to be robust against long delay spreads of the physical multipath channel. On the other hand, the CP itself is an overhead that reduces the system efficiency and decreases an actual data rate. The latest 802.11n and 802.11ac standards introduced two options for the CP value in order to adjust it to a specific link conditions and to reduce the overhead. However, in many applications, an Access Point (AP) chooses the CP by the average or by the worst case among all the clients, therefore a client that requires long CP implies that all the transmissions are done with a long CP. Another issue related to the decision on the CP value is that usually the AP knows the capability of each client. Those issues lead to inefficient usage of CP where the robustness is preferred on the efficiency and the system throughput is not optimized.

SUMMARY

Embodiments of the present application provide a method and an apparatus for determining a CP value, so that overhead may be reduced and system throughput may be optimized.

In a first aspect, a method for determining a CP is provided, comprising: performing, by a station (STA), channel estimation; determining, by the STA, a CP value according to the result of channel estimation; and sending, by the STA, indication information to an access point (AP), wherein the indication information is used for indicating the CP value.

In an implementation manner, the sending indication information to an AP, comprising: comparing the determined CP value with a pre-set CP value; and sending the indication information to the AP according to the result of comparison.

In a second aspect, a method for determining a CP is provided, comprising: receiving, by an access point (AP), indication information sent from at least one station (STA); and determining, by the AP, a required CP value according to the indication information.

In an embodiment, three CP values are used for indoor and outdoor transmission, and the length of indication information is 2 bits. If the determined CP value is equal to the pre-set CP value, the indication information is 00; if the determined CP value is not equal to the pre-set CP value, the indication information is 01 or 10 or 11; wherein, 00 refers to a required CP value is equal to the pre-set CP value, 01 refers to the required CP value is 0.8 µs, 10 refers to the required CP value is 1.6 µs, 11 refers to the required CP value is 3.2 µs.

In another embodiment, two CP values are used for outdoor transmission, and the length of indication information is 1 bit. If the determined CP value is equal to the pre-set CP value, the indication information is 0; if the determined CP value is not equal to the pre-set CP value, the indication information is 1; wherein, 0 refers to a required CP value is equal to the pre-set CP value, 1 refers to the required CP value is not equal to the pre-set CP value.

In a third aspect, an apparatus for determining a CP is provided, comprising corresponding units which are used to implement the method shown in the first aspect shown above.

Optional, the apparatus in the third aspect can be a station.

In a fourth aspect, an apparatus for determining a CP is provided, comprising corresponding units which are used to implement the method shown in the second aspect shown above.

Optional, the apparatus in the third aspect can be an access point.

In a fifth aspect, a non-transitory, computer-readable medium having processor-executable instructions stored thereon for determining a CP is provided, the processor-executable instructions, when executed, facilitating performance of the method shown in the first aspect or the second aspect shown above.

According to embodiments of the present invention, a mechanism is introduced which allows stations to inform the AP on the required or requested CP value based on physical channel examination. Accordingly, the AP may choose a suitable CP. Therefore, overhead may be reduced and system throughput may be optimized.

BRIEF DESCRIPTION OF DRAWINGS

To illustrate the technical solutions in the embodiments of the present invention more clearly, a brief introduction on the accompanying drawings which are needed in the description of the embodiments or the prior art is given below. Apparently, the accompanying drawings in the description below are merely some of the embodiments of the present invention, based on which other drawings can be acquired by the persons of ordinary skill in the art without any inventive effort.

FIG. 3 is a schematic diagram illustrating 3 groups of STAs;

FIG. 4(a)-4(c) is a schematic diagram illustrating data transmission between the AP and the STA;

DESCRIPTION OF EMBODIMENTS

The technical solutions in the embodiments of the present invention will be described clearly and completely hereinafter with reference to the accompanying drawings in the embodiments of the present invention. Evidently, the described embodiments are merely part, but not all, of the embodiments of the present invention. All other embodiments, which can be derived by persons of ordinary skills in the art based on the embodiments of the present invention without any inventive efforts, shall fall into the protection scope of the present invention.

Figure 1:
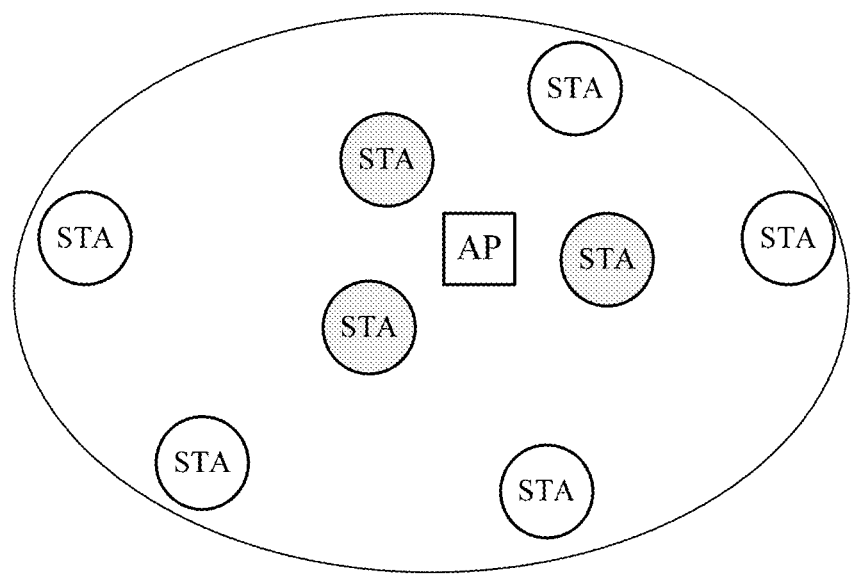
FIG. 1 is a schematic diagram illustrating a basic service set.

FIG. 1 is a schematic diagram illustrating a basic service set (BSS). The BSS provides the basic building-block of an 802.11 wireless LAN. In infrastructure mode, a single access point (AP) together with all associated stations (STAs) is called a BSS. The AP acts as a master to control the stations within the BSS; the simplest BSS consists of one access point and one station.

In FIG. 1, an AP and a plurality of STAs are shown, where the STA may be called as a client or a client device too.

The 802.11n and 802.11ac standards define two possible CP values that can be used for any transmission. The long CP is 0.8 μs and the short one is 0.4 μs. The AP chooses a CP value that is suitable to current target STA's capabilities. Often, the worst case among all the STAs associated with the AP is chosen for all transmissions.

Figure 2:
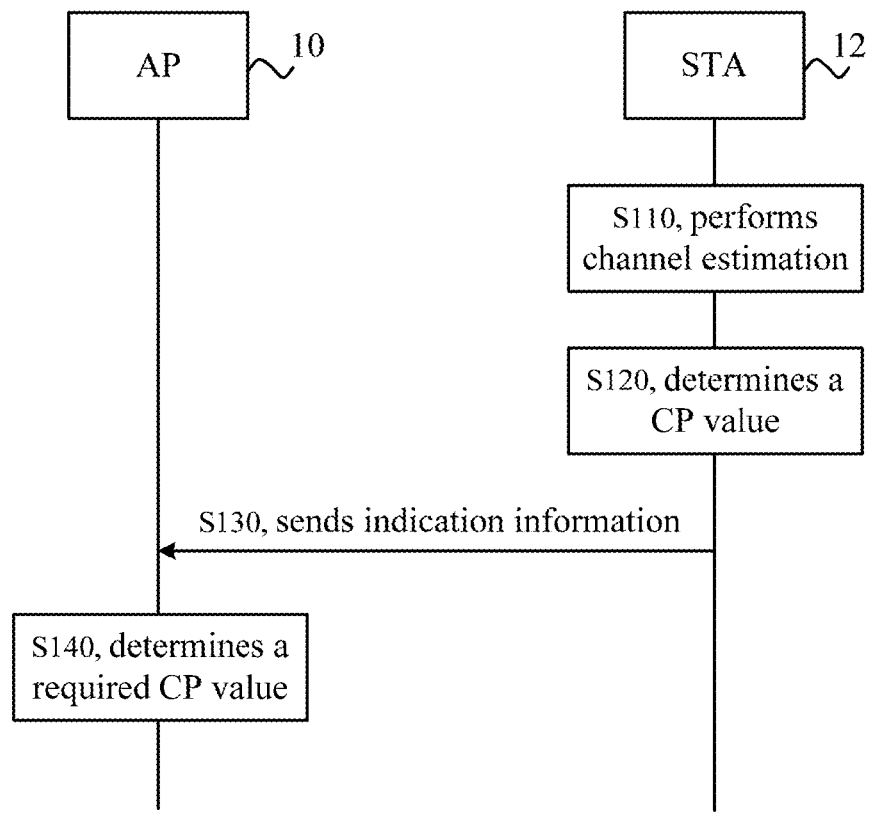
FIG. 2 is a schematic flow chart of a method for determining a CP according to an embodiment of the present invention.

FIG. 2 is a schematic flow chart of a method for determining a CP according to an embodiment of the present invention. There are one AP (AP 10) and two STAs (STA 12 and STA 14) shown in FIG. 2. The distance between the STA 12 and the AP 10 is smaller than that between the STA 14 and the AP 10. In another word, the STA 12 is close to the AP 10, and the STA 14 is far from the AP 10.

It should be understood that, a pre-set CP value is stored in the AP 10. For example, the pre-set CP value may be 0.8 μs, or may be 0.4 μs, or may be another value (i.e., 1.6 μs or 3.2 μs). The STA 12 and the STA 14 may obtain the pre-set CP through a controlling signaling sent by the AP 10. The pre-set CP value can be called as a default CP value, and it is robust enough for all the STAs in the BSS which the AP 10 located.

The method shown in FIG. 2 includes:

S110, STA 12 performs channel estimation.

Any one STA of the STAs in the BSS may perform the channel estimation. Take STA 12 as an example, the STA 12 may estimate physical channel delay spread. Specifically, the STA 12 may perform the estimation of channel link conditions based on preamble sequence which is received by the STA 12 from the AP 10.

S120, STA 12 determines a CP value according to the result of channel estimation performed by the STA 12 in S110.

Any one STA of the STAs in the BSS may determine a CP value after performing the channel estimation.

In an implementation, the STA 12 may determine a small CP value when the channel condition between the STA 12 and the AP 10 is good, and the STA 12 may determine a large CP value when the channel condition between the STA 12 and the AP is bad.

For example, the STA 12 may calculate a quantification value according to the result of the channel estimation; then the STA 12 may obtain a CP value corresponding to the quantification value. A corresponding relationship between a quantification value and a CP value may be pre-stored in the STA 12.

In another implementation, the STA 12 may calculate the distance between the STA 12 and the AP 10 according to the result of the channel estimation; then determine a CP value according to the distance.

For example, the STA 12 may determine a small CP value when the distance is smaller than L, and the STA 12 may determine a large CP value when the distance is larger than L, where L is a pre-defined value. For instance, L=5 m or L=10 m, which is not limited in the present application.

For example, a corresponding relationship between a CP value and a distance range may be pre-stored in the STA 12. Table 1 shown below is an example of the relationship. Thus the STA 12 may determine the CP value according to the pre-stored relationship.

TABLE 1

| CP value | distance |
|---|---|
| 0.8 μs | 0-5 m |
| 1.6 μs | 5 m-10 m |
| 3.2 μs | >10 m |

Clearly, the CP value determined by the STA 12 may be regarded as a required CP value of STA 12.

S130, STA 12 sends indication information to AP 10.

The indication information may be used for indicating the CP value determined by the STA 12 in S120.

In an implementation, the indication information may include the determined CP value, so that the AP 10 may obtain the required CP value of STA 12 according to the indication information.

In another implementation, the STA 12 may compare the determined CP value with the pre-set CP value, and then sends the indication information according to the result of comparison.

For instance, the STA 12 may compare the determined CP value with the pre-set CP value, and may generate the indication information according to the result of comparison, and then sends the indication information.

Specifically, if three CP values are used for indoor and outdoor transmission:

If the determined CP value is equal to the pre-set CP value, the indication information generated by the STA 12 is 00. In other words, two bits "00" refer to that the pre-set CP value is equal to the determined CP value.

If the determined CP value is not equal to the pre-set CP value, the indication information generated by the STA 12 may be 01 or 10 or 11. In other words, two bits "01" may refer to the first CP value of the three CP values, two bits "10" may refer to the second CP value of the three CP values, and two bits "11" may refer to the third CP value of the three CP values.

For example, if the three CP values are 0.8 μs, 1.6 μs and 3.2 μs. Then, "01" may refer to the required CP value is 0.8 μs, "10" may refer to the required CP value is 1.6 μs, "11" may refer to the required CP value is 3.2 μs.

In this situation, the length of indication information is 2 bits. Therefore, only a litter resource is used with a very low amount of bits, and the indication information will not disturb normal transmission in the BSS, or the interference to the normal transmission is little.

Specifically, if two CP values are used for outdoor transmission:

If the determined CP value is equal to the pre-set CP value, the indication information generated by the STA 12 is 0. In other words, one bit "0" refers to that the pre-set CP value is equal to the determined CP value.

If the determined CP value is not equal to the pre-set CP value, the indication information generated by the STA 12 is 1. In other words, one bit "1" refers to that the pre-set CP value is not equal to the determined CP value.

In this situation, the length of indication information is 1 bit. Therefore, only a litter resource is used with a very low amount of bits, and the indication information will not disturb normal transmission in the BSS, or the interference to the normal transmission is little.

Optionally, the indication information may be carried in medium access control (MAC) payload.

Additionally, the method of S110 to S130 may be performed by STA 12 periodically. The period may be a few hours or a few days, which is not limited in the present application.

It should be understood that, every one STA in the BSS may perform the method S110 to S130. The period for different STAs may be the same, or different STAs may have different periods, which is not limited in the present application.

S140, AP 10 determines the required CP value according to the indication information.

After AP 10 receiving indication information sent from a STA, the AP 10 may determines a required CP value related to the STA. That is to say, AP 10 may determines required CP value for every one STA which performs S110 to S130, and the required CP value for different STAs may be the same or may be different.

In an implementation, if the indication information includes the determined CP value, then AP 10 may obtain the required from the indication information directly.

In another implementation, if three CP values are used for indoor and outdoor transmission: AP 10 may determine the required CP value is equal to the pre-set CP value if the indication information is 00, and AP 10 may determine the required CP value is not equal to the pre-set CP value if the indication information is 01 or 10 or 11.

Specifically, AP 10 may determine the required CP value is the first CP value of the three CP values if the indication information is 01; AP 10 may determine the required CP value is the second CP value of the three CP values if the indication information is 10; and AP 10 may determine the required CP value is the third CP value of the three CP values if the indication information is 11.

For example, if the three CP values are 0.8 μs, 1.6 μs and 3.2 μs. Then, "01" may refer to the required CP value is 0.8 μs, "10" may refer to the required CP value is 1.6 μs, "11" may refer to the required CP value is 3.2 μs.

In another implementation, if two CP values are used for outdoor transmission: AP 10 may determine the required CP value is equal to the pre-set CP value if the indication information is 0, and AP 10 may determine the required CP value is not equal to the pre-set CP value if the indication information is 1.

For example, if the two CP values are 0.4 μs and 0.8 μs. Then, "0" may refer to the required CP value is the same as the pre-set CP value, and "1" may refer to the required CP value is the other CP value different from the pre-set CP value.

After S140, AP 10 may store a relationship between an ID of STA and a required CP value. Table 2 shown below is an example of the relationship.

TABLE 2

| CP value | ID of STA |
| --- | --- |
| 0.8 μs | ID1, ID2, ID3, . . . |
| 1.6 μs | ID4, ID5, . . . |
| 3.2 μs | ID6 |

Based on the relationship shown in Table 2, all STAs in the BSS can be divided in to several groups (i.e., 3 groups). There are different CP values for different groups.

As shown in FIG. 3, there are 3 groups of STAs. The distance between the AP and any one STA in a first group is less than a first threshold, the distance between the AP and any one STA in a second group is greater than the first threshold and less than a second threshold, the distance between the AP and any one STA in a third group is greater than the second threshold, where the second threshold is greater than the first threshold.

The first group may be called as a close group, which has CP value of 0.8 μs. The second group may be called as a middle group, which has CP value of 1.6 μs. The third group may be called as a far group, which has CP value of 3.2 μs. As another understand, there are 3 types of STAs, the first type of STAs belong to the first group; the second type of STAs belong to the second group; and the third type of STAs belong to the third group.

During the process of downlink transmission, AP 10 may send data to the STA 12 according to the required CP value which is determined in S140.

For single-user (SU) transmission, AP 10 may use the required CP value related to the STA 12, and send data to the STA 12.

For example, if the indication information sent by the STA 12 is "01", AP 10 may send the data to STA 12 with 0.8 μs CP.

As shown in FIG. 4(*a*) and FIG. 4(*b*), if STA$_1$ is closer to the AP, the required CP value may be smaller shown in FIG. 4(*a*); if STA$_2$ is farer from the AP, the required CP value may be greater shown in FIG. 4(*b*).

For multi-user (MU) transmission, AP 10 may determine the used CP value according to the required CP values of the destinations.

AP 10 may receive indication information from each STA, and AP 10 may determine several CP values for all the STAs. If AP 10 will send data to several STAs (i.e., broadcasts the data), then AP 10 may choose a maximum CP value from several required CP values corresponding to the several STAs, and take it as the used CP value. If AP 10 will send data to all STAs in the BSS, then AP 10 may choose a maximum CP value from all required CP values corresponding to the several STAs, and take it as the used CP value.

As shown in FIG. 4(*c*), AP will choose the maximum CP value if AP is sending data to STA$_1$ and STA$_2$ simultaneously. So that it can ensure the data may be received by both STA$_1$ and STA$_2$ successfully.

It should be understood that, if AP 100 sends data the several STAs which belong to the same group (i.e., the second group shown in FIG. 3), it is similar to that of SU transmission.

According to the present application shown above, a more suitable CP value is used by the AP, so that the overhead of each frame is minimized and the overall throughput is maximized.

Figure 5:
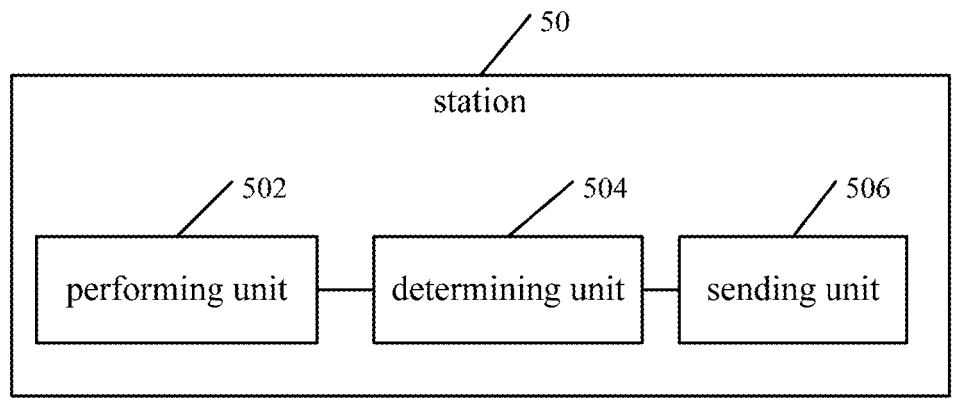
FIG. 5 is a schematic diagram illustrating structure of a station according to an embodiment of the present invention.

Refer to FIG. 5, is a schematic diagram illustrating structure of a station according to an embodiment of the present invention. The STA 50 shown in FIG. 5 includes a performing unit 502, a determining unit 504 and a sending unit 506.

The performing unit 502 is configured to perform channel estimation. The determining unit 504 is configured to determine a CP value according to the result of channel estimation performed by the performing unit 502. The sending unit 506 is configured to send indication information to an AP, wherein the indication information is used for indicating the CP value determined by the determining unit.

In an embodiment, the sending unit 506 is specifically configured to compare the determined CP value with a pre-set CP value, and send the indication information to the AP according to the result of comparison.

Figure 6:
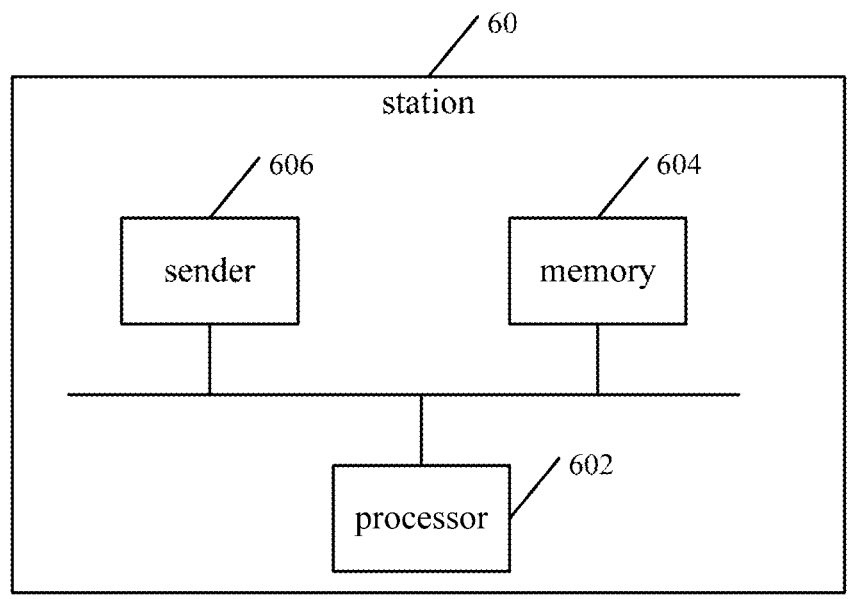
FIG. 6 is another schematic diagram illustrating structure of a station according to an embodiment of the present invention.

The performing unit 502 and the determining unit 504 may be implemented by a process, the sending unit may be implemented by a sender, FIG. 6 is another schematic diagram illustrating structure of a station. The station 60 shown in FIG. 6 includes a processor 602, a memory 604 and a sender 606.

The memory 604 is used for storing programs, and the processor 602 is used for implementing the programs stored in the memory 604.

Additionally, the memory 604 is also used for storing the relationships shown above.

The station 50 in FIG. 5 or the station 60 in FIG. 6 may be used for implement the method performed by STA 12 shown in FIG. 2, and will not be described redundantly herein.

Figure 7:
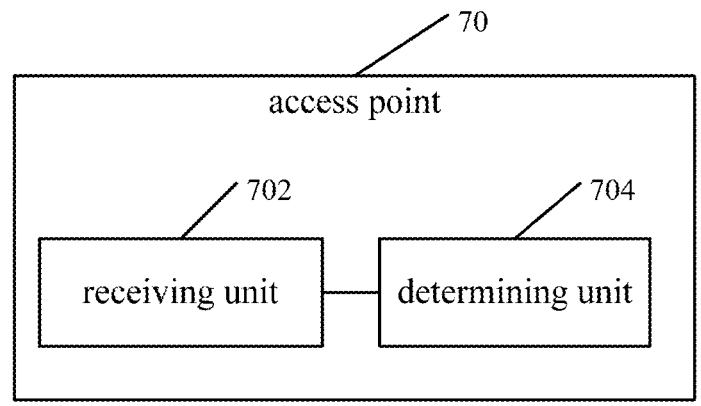
FIG. 7 is a schematic diagram illustrating structure of an access point according to an embodiment of the present invention.

Refer to FIG. 7, is a schematic diagram illustrating structure of an access point according to an embodiment of the present invention. The AP 70 shown in FIG. 7 includes a receiving unit 702 and a determining unit 704.

The receiving unit 702 is configured to receive indication information sent from at least one STA. The determining unit 704 is configured to determine a required CP value according to the indication information received by the receiving unit 702.

Additionally, the AP 70 may further include a sending unit, which is configured to send data to the at least one STA according to the required CP value determined by the determining unit 704.

In an embodiment, three CP values are used for indoor and outdoor transmission, the determining unit 704 is specifically configured to: if the indication information is 00, determine the required CP value is equal to a pre-set CP value; if the indication information is 01, determine the required CP value is 0.8 µs; if the indication information is 10, determine the required CP value is 1.6 µs; if the indication information is 11, determine the required CP value is 3.2 µs.

In another embodiment, two CP values are used for outdoor transmission, the determining unit 704 is specifically configured to: if the indication information is 0, determine the required CP value is equal to a pre-set CP value; if the indication information is 1, determine the required CP value is the other value different from the pre-set CP value.

Figure 8:
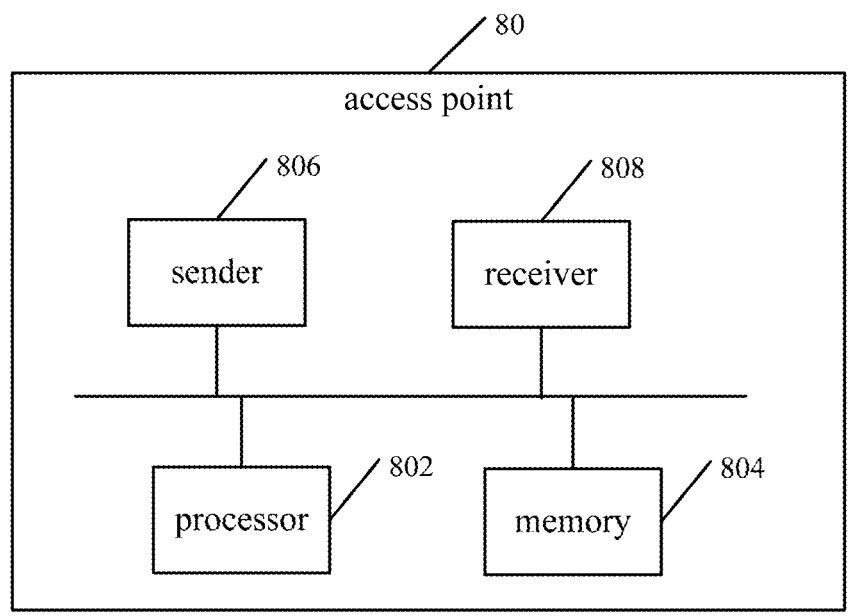
FIG. 8 is another schematic diagram illustrating structure of an access point according to an embodiment of the present invention.

The receiving unit 702 may be implemented by a receiver, the sending unit may be implemented by a sender, and the determining unit 704 may be implemented by a process, FIG. 8 is another schematic diagram illustrating structure of an access point. The AP 80 shown in FIG. 8 includes a processor 802, a memory 804, a sender 806 and a receiver 808.

The memory 804 is used for storing programs, and the processor 802 is used for implementing the programs stored in the memory 804.

Additionally, the memory 804 is also used for storing the relationships shown above.

The access point 70 in FIG. 7 or the access point 80 in FIG. 8 may be used for implement the method performed by AP 10 shown in FIG. 2, and will not be described redundantly herein.

Additionally, a non-transitory, computer-readable medium having processor-executable instructions stored thereon for determining a CP, the processor-executable instructions, when executed, facilitating performance of the following: performing channel estimation; determining a CP value according to the result of channel estimation; and sending indication information to an AP, wherein the indication information is used for indicating the CP value.

Additionally, a non-transitory, computer-readable medium having processor-executable instructions stored thereon for determining a CP, the processor-executable instructions, when executed, facilitating performance of the following: receiving indication information sent from at least one STA; and determining a required CP value according to the indication information.

The persons of ordinary skills in the art may realize that the units and steps of algorithm of the respective examples, described with reference to the embodiments disclosed in the text, can be accomplished by electronic hardware, or a combination of computer software and electronic hardware. Whether these functions are executed by means of hardware or software depends on a specific application and a design constraint condition of the technical solutions. Professional technical personnel may accomplish the described functions by adopting a different method for each specific application, but this kind of accomplishment shall not go beyond the scope of the present application.

Those skilled in the art may understand clearly that, for convenience and simplicity of description, specific working processes of the above-described systems, apparatus and units may be referred to corresponding processes in the aforementioned embodiments of the methods, and will not be described repeatedly herein.

In several embodiments provided by the present application, it shall be understood that disclosed systems, apparatus and methods may be implemented by other manners. For example, the embodiments of the apparatus described above are just illustrative. For example, division of the units is just a kind of division according to logical functions, and there may be other division manners for practical implementations. For example, a plurality of units or components may be combined or integrated into another system, or some features may be neglected or may not be performed. In addition, the shown or discussed mutual coupling or direct coupling or communication link may be an indirect coupling or communication link through some interfaces, apparatus or units, which may be in an electrical form, a mechanical form or in other forms.

The units described as separated parts may be, or may not be, physically separated, and the parts shown as units may be, or may not be, physical units, which may be located in one place or distributed to a plurality of network elements. Part or all units therein may be selected, according to an actual need, to implement the objective of solutions provided in the present application.

In addition, the respective functional units in the respective embodiments of the present application may be integrated into one processing unit, or the respective units may exist separately and physically, or, two or more units may be integrated into one unit.

It should be appreciated that the term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concept in a concrete fashion. As used in the present disclosure, the term "and/or" is intended to mean an inclusive "and/or". That is, unless specified otherwise, or clear from context, "X includes A and/or B" is intended to mean any of natural inclusive permutations, i.e., X may be A, or X may be B, or X may be A and B.

Various embodiments are described in the general context of method steps or processes, which may be implemented in one embodiment by a computer program product, embodied in a computer-readable memory, including computer-executable instructions, such as program code, executed by computers in networked environments. A computer-readable memory may include removable and non-removable storage devices including, but not limited to, read only memory (ROM), random access memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions describes in such steps or processes. Various embodiments may include a computer-readable medium including computer executable instructions which, when executed by a processor, cause an apparatus to perform the methods and processors described herein.

Embodiments of the present application may be implemented in software, hardware, application logic or a combination thereof. The software, application logic and/or hardware may reside on a user device, or a controller, such as a content server or a controller. In an exemplary embodiment, the application logic, software or an instruction set is maintained on any one of various conventional computer-readable media. In the context of the present disclosure, the term "computer-readable medium" may be any media or means that can contain, store, communicate, propagate or transport the instructions for use by or in connection with an instruction execution system, apparatus or device, such as a computer.

In the end, it should be noted that the preceding embodiments are merely used to illustrate the technical solutions of the present application rather than limiting the present disclosure. Though the present disclosure is illustrated in detail by referring to the preceding embodiments, it should be understood by one of skill in the art that modifications may still be made on the technical solutions disclosed in the preceding respective embodiments, or equivalent alterations may be made to a part of technical characteristics thereof; and these modifications or alterations do not make the nature of corresponding technical solutions departure from the spirit and scope of the technical solutions of the respective embodiments of the present disclosure.

What is claimed is:

1. A method for determining a cyclic prefix (CP), comprising:
    performing, by a station (STA), channel estimation of a channel between the STA and an access point (AP);
    determining, by the STA, a CP value for downlink transmission to the STA according to the channel estimation; and
    sending, by the STA, indication information to the AP, wherein the indication information indicating the CP value for downlink transmission to the STA, wherein sending indication information to the AP, comprising:
    comparing the CP value with a pre-set CP value; and
    sending the indication information to the AP according to a result of comparison; and
    wherein:
        if two CP values are used for outdoor transmission, and the length of indication information comprises 1 bit;
            if the CP value is equal to the pre-set CP value, the indication information comprises 0, wherein 0 refers to a required CP value is equal to the pre-set CP value;
            if the CP value is not equal to the pre-set CP value, the indication information comprises 1, wherein 1 refers to the required CP value is not equal to the pre-set CP value; or
        if three CP values are used for indoor and outdoor transmission, and the length of indication information comprises 2 bits;
            if the CP value is equal to the pre-set CP value, the indication information comprises 00, wherein 00 refers to a required CP value is equal to the pre-set CP value; and
            if the CP value is not equal to the pre-set CP value, the indication information comprises 01 or 10 or 11, wherein 01 refers to the required CP value is 0.8 µs, 10 refers to the required CP value is 1.6 µs, and 11 refers to the required CP value is 3.2 µs.

2. A method for determining a cyclic prefix (CP), comprising:
    receiving, by an access point (AP), indication information sent from at least one station (STA), wherein the indication information indicating a required CP value for downlink transmission to the at least one STA;
    determining, by the AP, the required CP value according to the indication information, wherein determining the required CP value according to the indication information comprises:
    determining that two CP values are used for outdoor transmission, and the length of indication information is 1 bit;
        if the indication information is 0, determining the required CP value is equal to a pre-set CP value; and
        if the indication information is 1, determining the required CP value is another value different from the pre-set CP value; or
    determining that three CP values are used for indoor and outdoor transmission, and the length of indication information is 2 bits;
        if the indication information is 00, determining the required CP value is equal to a pre-set CP value;
        if the indication information is 01, determining the required CP value is 0.8 µs;
        if the indication information is 10, determining the required CP value is 1.6 µs; and
        if the indication information is 11, determining the required CP value is 3.2 µs; and sending, by the AP, data to the at least one STA according to the required CP value.

3. An apparatus for determining a cyclic prefix (CP), comprising:

at least one processor; and a non-transitory computer-readable storage medium coupled to the at least one processor and storing programming instructions for execution by the at least one processor, the programming instructions instruct the at least one processor to perform operations comprising:

performing channel estimation of a channel between the apparatus and an access point (AP), determining a CP value for downlink transmission to the apparatus according to the channel estimation; and sending indication information to the AP, wherein the indication information indicating the CP value for downlink transmission to the apparatus, wherein sending indication information to the AP comprising:

comparing the CP value with a pre-set CP value; and sending the indication information to the AP according to a result of comparison; and wherein:

if two CP values are used for outdoor transmission, and the length of indication information comprises 1 bit;

if the CP value is equal to the pre-set CP value, the indication information comprises 0, wherein 0 refers to a required CP value is equal to the pre-set CP value;

if the CP value is not equal to the pre-set CP value, the indication information comprises 1, wherein 1 refers to the required CP value is not equal to the pre-set CP value; or if three CP values are used for indoor and outdoor transmission, and the length of indication information comprises 2 bits;

if the CP value is equal to the pre-set CP value, the indication information comprises 00, wherein 00 refers to a required CP value is equal to the pre-set CP value; and if the CP value is not equal to the pre-set CP value, the indication information comprises 01 or 10 or 11, wherein 01 refers to the required CP value is 0.8 µs, 10 refers to the required CP value is 1.6 µs, and 11 refers to the required CP value is 3.2 µs.

4. An apparatus for determining a cyclic prefix (CP), comprising:

at least one processor; and a non-transitory computer-readable storage medium coupled to the at least one processor and storing programming instructions for execution by the at least one processor, the programming instructions instruct the at least one processor to perform operations comprising:

receiving indication information sent from at least one station (STA), wherein the indication information indicating a required CP value for downlink transmission to the at least one STA;

determining the required CP value according to the indication received information, wherein determining the required CP value according to the indication information comprises:

determining that two CP values are used for outdoor transmission, and the length of indication information is 1 bit;

if the indication information is 0, determining the required CP value is equal to a pre-set CP value; and if the indication information is 1, determining the required CP value is another value different from the pre-set CP value; or determining that three CP values are used for indoor and outdoor transmission, and the length of indication information is 2 bits;

if the indication information is 00, determining the required CP value is equal to a pre-set CP value;

if the indication information is 01, determining the required CP value is 0.8 µs;

if the indication information is 10, determining the required CP value is 1.6 µs; and if the indication information is 11, determining the required CP value is 3.2 µs; and sending, by the AP, data to the at least one STA according to the required CP value.

* * * * *